Jan. 9, 1973 H. H. RICE 3,709,772
THERMALLY INSULATED COMPOSITE ARTICLE
Filed July 16, 1971

INVENTOR.
Hal H. Rice
BY
C.R. Engle
ATTORNEY

United States Patent Office 3,709,772
Patented Jan. 9, 1973

3,709,772
THERMALLY INSULATED COMPOSITE ARTICLE
Hal H. Rice, Birmingham, Mich., assignor to General
Motors Corporation, Detroit, Mich.
Filed July 16, 1971, Ser. No. 163,323
Int. Cl. B32b 3/20
U.S. Cl. 161—139                                    11 Claims

ABSTRACT OF THE DISCLOSURE

A thermally insulated fluid conducting composite article including a rigid inner core member of erosion resistant material defining a fluid passage and being cushioned from an outer metallic shell by an intermediate layer of resilient material. The core member thermally insulates the outer metal shell from the fluid flowing therethrough while the cushioning layer absorbs shock loads between the core and the shell thereby reducing the possibility of fracture of the somewhat fragile rigid core member.

---

This invention relates to a thermally insulated composite article of the type including a ceramic core disposed within a metal outer shell wherein the ceramic core acts as a thermal insulator between a fluid passing through the article and the outer metal shell. More specifically, this invention relates to a composite article wherein the ceramic core is resiliently cushioned from direct engagement with the inner surface of the metal shell thereby preventing shock loads from being directly transmitted between the core and the shell.

Thermally insulated composite fluid conducting articles are well known in the prior art. A problem frequently encountered during the use of such articles is the fracturing of a rigid core or liner member which is usually directly attached to a metal outer shell. Such articles are formed by either casting a ceramic core member within a preformed metal shell or the metal shell is cast about a preformed ceramic core whereby the metal flows into the pores of the outer surface of the core resulting in a bonding engagement necessary to secure the members together. Obviously, with a structure of this type any shock load either applied directly to the core or to the exterior of the metal shell is directly transmitted from the one to the other. Consequently, after relatively short periods of use in an environment such as an exhaust manifold in an automobile vehicle exhaust gas system, the liner fractures and the thermal insulating effect of the liner is greatly reduced.

It is, therefore, a purpose of this invention to provide a composite article including a rigid core member having high insulating qualities that is resiliently cushioned from an outer metal shell. This structure is constructed by preforming the rigid core from a ceramic fused silica foam or a similar material having the desired insulating qualities, applying a fibrous resilient refractory coating on the outer surface of the core member, and casting a metal shell upon the cushioning layer completing the composite article. By providing a predetermined thickness of cushioning material between the metal outer shell and the rigid ceramic core member the shrinkage of the metal resulting during the casting operation does not cause compression and fracturing of the core and the core is also sufficiently rigidly supported within the liner such that any shock loads resulting from the fluid flowing through the core member will be absorbed by the cushioning layer preventing undesirable fracturing and consequent loss of insulating ability of the core member.

Accordingly, among the objects of this invention is the provision of a thermally insulated composite fluid conducting article including a core member of erosion resistant material being cushioned from an outer metal shell by an intermediate layer of resilient material.

Another object of this invention is the provision of a thermally insulated fluid conducting composite article wherein a core member is formed of a rigid ceramic fused silica foam and defines a fluid conducting passage thereby insulating a metal shell from the temperature of the fluid flowing therethrough, the core having a layer of cushioning material disposed upon its outer surface intermediate the metal shell preventing the transmission of shock loads between the core and the metal shell.

A still further object of this invention is the provision of a vehicle exhaust manifold including a core of rigid ceramic fused silica foam defining a gas passage therethrough, the core having a layer of cushioning material disposed on its outer surface intermediate the core and a confining metal shell whereby the core insulates the metal shell from the temperature of the gas flowing therethrough.

Yet another object of this invention is the provision of a vehicle exhaust manifold including a metal outer shell containing an insulating core member of a rigid ceramic fused silica foam defining a fluid passage therethrough wherein a cushioning layer of aluminum silicate fiber is disposed intermediate the core and the outer shell preventing the transmission of shock loads therebetween while the ceramic core insulates the metal shell from the temperature of exhaust gases flowing therethrough so as to maintain the exhaust gases at a sufficiently high temperature to result in a secondary combustion condition reducing emission of unburned hydrocarbons to atmosphere.

Yet another object of this invention is the provision of a thermally insulated fluid conducting composite article including a rigid ceramic silica foam inner core member having a layer of cushioning material on its outer surface intermediate a metal shell cast thereabout, the ceramic inner core having insulating characteristics sufficient to conserve heat in the fluid conducting passage while also providing chambers of sufficient volume whereby the vehicle exhaust gases flowing therethrough will admix with air and result in a secondary combustion prior to the emission of the exhaust gases to atmosphere.

A still further object of this invention is the provision of a thermally insulated vehicle exhaust manifold including a rigid core member formed of a spodumene-clay foam with a metallic shell cast thereabout and an intermediate layer of cushioning between the metallic shell and the core member whereby the transmission of shock loads between the core and the metallic shell are cushioned and the core member has insulating characteristics such that an exhaust gas flowing therethrough is retained at a sufficiently high temperature to result in secondary combustion of a major portion of the unburned hydrocarbons present in the exhaust gases thereby significantly reducing the emission of hydrocarbons to atmosphere.

Figure 1:
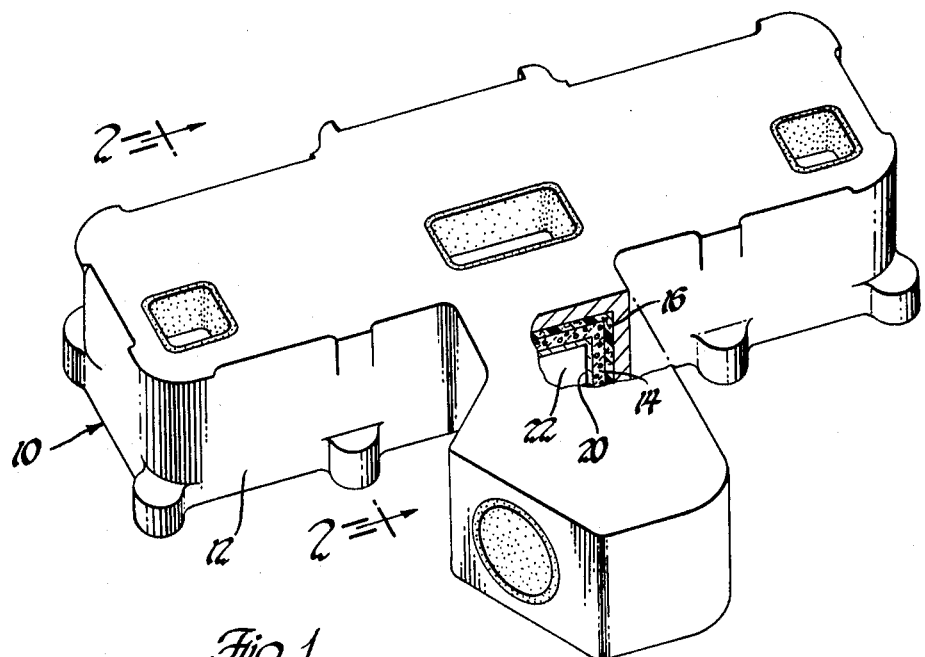
FIG. 1 is a perspective view, partly in section, of an automobile exhaust manifold comprising the thermally insulated composite article of this invention.
Figure 2:
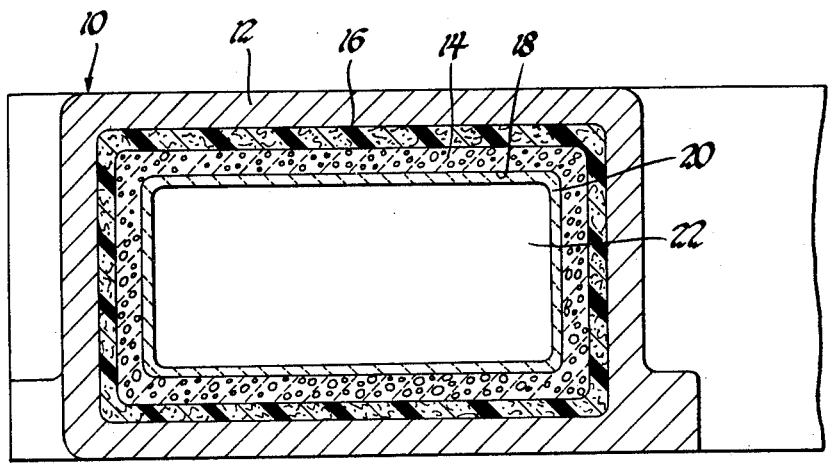
FIG. 2 is a cross sectional view taken on line 2—2 of FIG. 1.

Referring now to FIG. 1 a thermally insulated composite article in the form of a vehicle exhaust manifold 10 relates a preferred embodiment of the subject invention. As illustrated by the partially cutaway portion, the manifold 10 includes an outer metal shell 12 enclosing a core 14 formed of an erosion resistant insulating material having a resilient layer of cushioning material 16 disposed between the outer shell and the core member 14. While the composite thermally insulated article 10 is illustrated in the form of an automobile exhaust manifold, it can be readily appreciated that the composite article can be utilized in any environment where it is desired to thermally insulate a flowing fluid.

In preferred form, the core 14 is formed from a rigid ceramic fused silica foam either machined to a desired form or cast in a mold in a conventional manner. The fused silica foam is in excess of 99% $SiO_2$. It is essential to this invention, as used in the vehicle exhaust manifold art, that the ceramic fused silica have desirable insulating characteristics preventing conduction of heat from the exhaust gases flowing therethrough to the metal shell 12 encapsulating the core member. The ceramic fused silica foam is desirable because of its low coefficient of thermal expansion, i.e., not in excess of $0.8\% \times 10^{-6}$ in./in./° C. between room temperature and 800° C., coupled with excellent thermal shock resistance. This low rate of expansion of the core 14 can be matched with the temperature conducted to the metal shell whereby the rate of expansion of the shell and the core can be substantially equal in a specific application. A ceramic fused silica foam having a bulk density of twenty-five pounds per cubic foot having a thermal conductivity value of 1.0 B.t.u./(hr.) (° F.)(ft.$^2$)(in.) at 1000° F. was found to present a desirable thermal barrier between the fluids flowing through the core 14 and the outer metal shell 12.

Another material having desirable characteristics with respect to a low coefficient thermal expansion and good thermal shock resistance is a spodumene-clay foam (95% beta spodumene-5% clay), which is a lithia-alumina-silica material. This foamed material in a composite form has a density of 64 lbs. per cubic foot. As with the fused silica foam, the spodumene-clay foam can be machined from a prefered block to a desired shape or it can be cast into a desired shape in a plaster or paper lined mold.

With use of either the fused silica or the spodumene-clay foam it is necessary to form a layer of dense material on the inner surfaces 18 of the core defining fluid passage 22 therethrough. The layer of dense material 20 is required to prevent penetration of the gaseous material into the foam and consequent erosion thereof. When a fused silica foam is used to make up the core 14, granulated or powdered fused silica is applied to the inner surfaces of the core member and the granular particles are fused thereon in a dense layer 20 by any known method such as by passing an oxy-acetylene flame through the fluid conducting passage 22 at a rate to sufficiently heat and fuse the particulate material. When the foam is made up of the spodumene-clay formula, a slip of a similar material is run through the fluid passage 22 coating the inner core surfaces 18 followed by firing the core to create the desired dense layer 20.

As previously mentioned, the thermally insulated composite article 10 of the subject invention has particular application as an automotive exhaust manifold. Use of air injection at vehicle engine exhaust valve ports and modifications of the carburetor and distributor have improved the exhaust emission characteristics by reducing the parts per million of unburned hydrocarbons discharged to atmosphere. The emission of hydrocarbons can be further reduced by utilizing a thermally insulated exhaust manifold wherein a prescribed insulation effect takes place in combination with providing a desired internal volume sufficient to allow for the admixing of air with the exhaust gases while retaining them at a sufficiently high temperature resulting in a secondary combustion of the unburned carbons prior to exhausting the gases to atmosphere. This secondary combustion is accomplished by conserving heat and providing chambers of sufficient volume whereby the gases are retained for a sufficient time period to mix with the air and be heated to the required combustion temperature before passing outwardly of the vehicle tailpipe. It has been determined that once the temperature of the manifold inner walls, in the case of a composite manifold including the rigid ceramic silica foam core member, reaches 1250° F., the secondary combustion of the carbon monoxide and the hydrocarbons generates gaseous temperatures in a range of 1800 to 2000° F. The conversion of carbon monoxide to carbon dioxide begins in a temperature range from 1100 to 1250° F. and at these temperatures the unburned hydrocarbons oxidize to water. The generation of the gas temperatures up to the aforementioned range of 1800 to 2000° F. eliminates most of the unburned hydrocarbons whereby few remain in the emitted exhaust gases.

The cushioning layer 16 between the core 14 and the outer metal shell 12 provides a significant advantage in the thermally insulated composite article. The layer 16 can be provided by wrapping the outer surface of the core with an aluminum silicate fiber paper, prime constituents being $Al_2O_3$ and $SiO_2$ trade name Fiberfrax, to a thickness in the range of 0.120 to 0.200 inch. This thickness range accomplishes the required cushioning from the outer metal shell and yet is thin enough to sufficiently support the core in the event of an engine backfire in the case of an exhaust manifold. The aluminum silicate fiber paper contains fibers ranging from less than a micron to 10 microns in diameter and have a length ranging from 1/8 to 1½ inches. Paper having a thickness from 0.040 to 0.080 inch has provided satisfactory results. Of course, it is apparent that the cushioning layer 16 can be applied in various manners such as by spraying a liquid suspension of the aluminum silicate fibers against the foam parts or by blowing chopped fibers against a surface made tacky by the application of either ethyl or sodium silicate. The aluminum silicate fiber cushioning layer 16 also is effective as a thermal insulation barrier between the core 14 and the metal outer shell 12. For instance, in one test, a V-8 automotive engine was operated at 4000 r.p.m. full throttle during which time the exhaust gas inlet gases reached 1650° F. while the highest temperature recorded at the surface of the metal outer shell was 350° F. The cushioning layer 16 also provides a surface against which the metal shell can be cast without damage to the rigid foam core 14. Use of the 0.120 to 0.200 inch thickness of the cushioning layer is sufficient to allow iron or an aluminum alloy in a range of thicknesses of 0.1875 to 0.250 inch to be cast about the core whereby the cushioning layer absorbs all the shrinkage forces exerted by the metal while solidifying.

The embodiments above described relate preferred forms of the subject invention for purposes of illustration, it being understood that the invention can take many forms depending upon the type of construction in which the thermally insulated composite article is to be used. Further, this invention is not intended to be restricted to the above disclosure because it is apparent that other materials than those disclosed could be incorporated to provide the combined thermal and shock resistant concepts of this disclosure. For these reasons the invention should have the scope as determined by the following appended claims.

I claim:

1. A thermally insulated composite article comprising an inner core of erosion resistant material having an outer surface and at least one continuous inner surface defining a fluid passage therethrough, a layer of impervious material on the inner surface of said core defining the fluid passage, a layer of resilient cushioning material on the outer surface of said core, said cushioning layer being of a predetermined thickness in relation to the size of said core, and a metal shell cast upon said cushioning layer thereby enclosing said core.

2. A thermally insulated composite article as described in claim 1 wherein said inner core member is composed of a rigid ceramic fused silica foam.

3. A thermally insulated composite article as described in claim 1 wherein said layer of impervious material is composed of a ceramic fused silica heated sufficiently close to its melting point to cause it to bond to the inner surface of said core.

4. A thermally insulated composite article as described in claim 1 wherein said cushioning layer consists of a layer of aluminum silicate fibers on the outer surface of said core.

5. A thermally insulated composite article as described in claim 1 wherein said metal shell is formed of cast iron upon said cushioning layer.

6. A thermally insulated composite article as described in claim 1 wherein said metal shell is formed of an aluminum alloy cast upon said cushioning layer.

7. A thermally insulated composite article comprising an inner core of rigid ceramic fused silica foam having an outer surface and at least one continuous inner surface defining a fluid passage therethrough, a layer of a cement of ceramic fused silica mixed with water heated sufficiently to melt and fuse with the inner core surface providing a dense impervious surface defining said fluid passage, a cushioning layer of aluminum silicate fiber paper having a thickness in the range of 0.120–0.200 inch wrapped on the outer surface of said core, and a metal shell having a thickness in the range of 0.1875–0.250 inch cast around the wrapped core.

8. A thermally insulated composite article as described in claim 7 wherein said metal shell is composed of cast iron.

9. A thermally insulated composite article as described in claim 7 wherein said metal shell is composed of an aluminum alloy.

10. A thermally insulated composite article comprising an inner core of 95% beta spodumene-5% clay foam having an outer surface and at least one continuous inner surface defining a fluid passage therethrough, a layer of a spodumene-clay slip applied to the inner surfaces of said core and heated to form an impervious layer thereon, a cushioning layer of aluminum silicate fiber paper having a thickness in the range of 0.120–0.200 inch wrapped on the outer surface of said core, and a metal shell having a thickness in the range of 0.1875–0.250 inch cast around the wrapped core.

11. A thermally insulated composite article comprising an inner core of rigid ceramic fused silica foam having an outer surface and at least one continuous inner surface defining a fluid passage therethrough, a layer of fused ceramic silica on the inner surface of said core providing a dense impervious surface defining said fluid passage, a cushioning layer of fibrous aluminum silicate material having a predetermined thickness on the outer surface of said core, and a metal shell cast upon said cushioning layer enclosing said core.

References Cited

UNITED STATES PATENTS 3,614,967    10/1971    Royston _____ 161—160

WILLIAM A. POWELL, Primary Examiner

U.S. Cl. X.R.

161—151, 160, 162, 166, 170